United States Patent [19]

Kaupisch et al.

[11] 4,248,842
[45] Feb. 3, 1981

[54] REMOVAL OF CONTAMINANTS AND RECOVERY OF BY-PRODUCTS FROM HOT WASTE GAS STREAM

[75] Inventors: Kurt F. Kaupisch, Burlington, Ky.; Douglas W. Bennett; Raphael Katzen, both of Cincinnati, Ohio

[73] Assignee: International Telephone & Telegraph Corporation, New York, N.Y.

[21] Appl. No.: 17,388

[22] Filed: Mar. 5, 1979

[51] Int. Cl.³ ............................................. C01B 17/00
[52] U.S. Cl. ................................... 423/242; 423/547
[58] Field of Search .......... 423/242 A, 244 R, 244 A, 423/545, 547

[56] References Cited

U.S. PATENT DOCUMENTS

| | | | |
|---|---|---|---|
| 1,740,342 | 12/1929 | Hansen | 423/242 A |
| 1,931,408 | 10/1933 | Hodsman et al. | 423/242 A |
| 2,233,841 | 3/1941 | Lepsoe | 423/242 A |
| 3,957,951 | 5/1976 | Hokanson et al. | 423/242 A |

OTHER PUBLICATIONS

Sulfur Oxide Removal From Power Plant Stack Gas-Ammonia Scrubbing-Conceptual Design and Cost Study Series-TVA-Sep. 1970.

*Primary Examiner*—O. R. Vertiz
*Assistant Examiner*—Gregory A. Heller
*Attorney, Agent, or Firm*—James B. Raden; Harold J. Holt

[57] ABSTRACT

A process for the removal of sulfur dioxide and other contaminants and the recovery of ammonium sulfate as a by-product from a hot waste gas stream comprising cooling the waste gas stream to a temperature below 120° F., passing said waste gas stream in sequence through at least two separate absorption zones utilizing as an absorbent a recirculated aqueous salt solution of ammonium sulfite-bisulfite, withdrawing and oxidizing a portion of said aqueous ammonium sulfite-bisulfite salt solution under pressures and temperatures sufficient to substantially convert the salts to sulfate salts, and recycling the ammonia and sulfur dioxide vapors liberated during oxidation to the first absorption zone.

9 Claims, 1 Drawing Figure

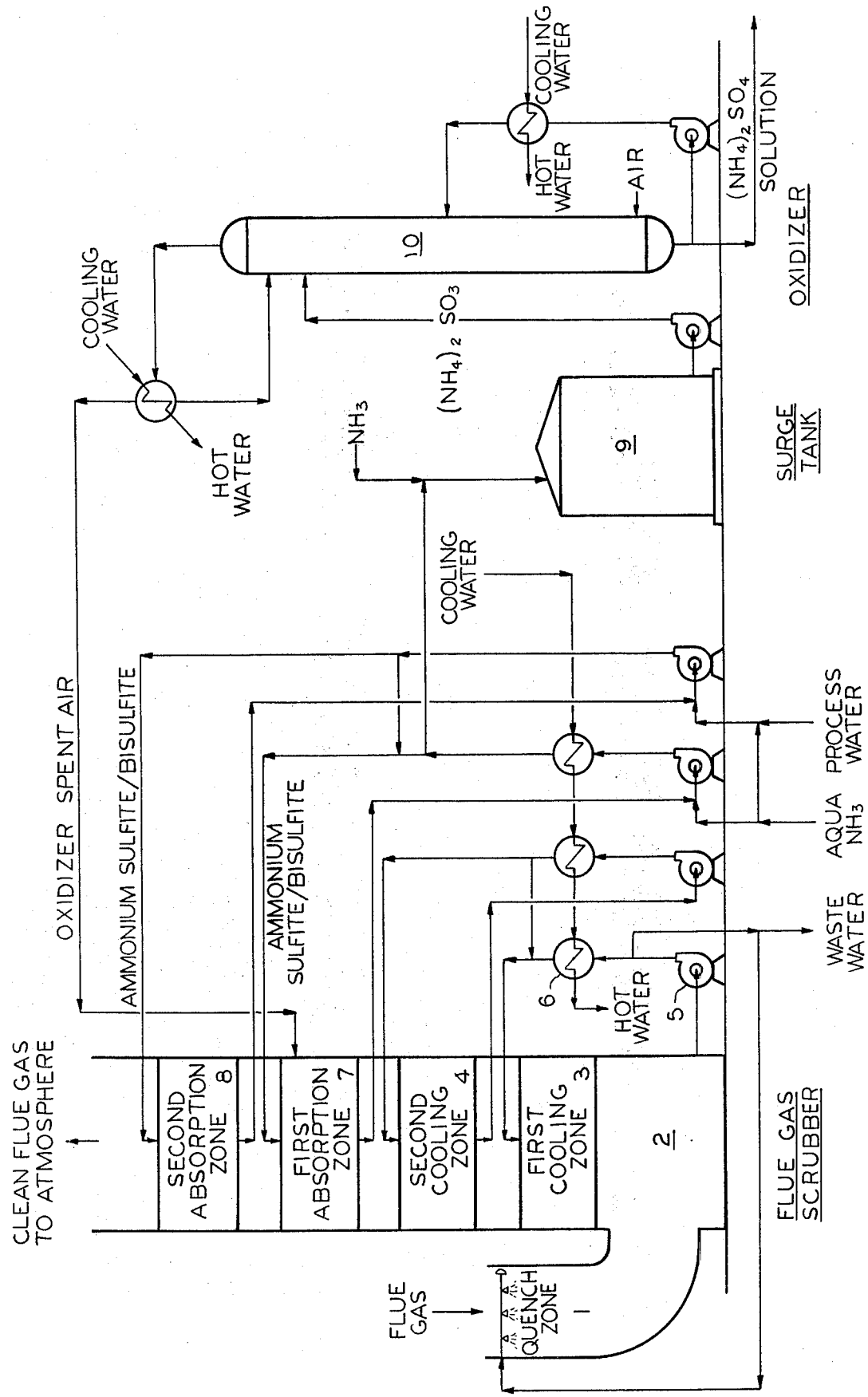

REMOVAL OF CONTAMINANTS AND RECOVERY OF BY-PRODUCTS FROM HOT WASTE GAS STREAM

This invention relates to a process for the removal of sulfur dioxide and other contaminants, and the recovery of ammonium sulfate as a by-product, from a hot waste gas stream.

Removal of sulfur oxides from gas streams by reaction with alkaline solutions has been known for many years. As early as 1883, British Pat. No. 1427 to Ramsey disclosed a process of absorbing sulfur dioxide into an ammoniacal solution. Ramsey's objective was not control of sulfur oxide emissions into the atmosphere, but rather production of ammonium sulfate without going through the sulfuric acid step. In Japan, a project first begun in 1926, concluded with the construction of a plant in 1937 for the production of ammonium sulfate. Pyrite ore was burned to supply sulfur dioxide which was absorbed in an aqueous solution of ammonium sulfite. The solution was then neutralized with ammonia and oxidized to ammonium sulfate using oxygen or air, the latter at 100 to 120 psig. (JECCO Process, "Ammonium Sulfate Production Without Free Acid", *Economic and Technical Monthly Japan*, Volume 1, No. 1, July 1952, page 22).

Beginning in 1953, the Tennessee Valley Authority conducted pilot plant studies to adapt ammonia scrubbing for sulfur oxides emission control in coal-burning power plants. A 1970 TVA publication ("Sulfur Oxide Removal From Power Plant Stack Gas", TVA, PB 196,804, September 1970, pages 37-79) discusses the combination of such ammonia scrubbing systems with the foregoing JECCO process for oxidation of sulfite to sulfate. However, the overall systems were not successful and TVA ultimately phased out its development efforts in this area.

U.S. Pat. No. 3,957,951, assigned to the present assignee, describes a process for scrubbing boiler flue gases with ammonium sulfite solutions which features high sulfur oxides recovery (low emission levels), a high degree of particulate removal and significant heat recovery. Scrubbing processes based on this design have overcome the problems encountered with the TVA-type design, and have been successfully operated for several years in pulp mills.

However, notwithstanding the foregoing efforts, a satisfactory system for both controlling sulfur dioxide emissions (in order to comply with emission standards) and producing ammonium sulfate has not previously been achieved.

It is a primary object of the present invention to provide a practical and efficient process for both removal of sulfur oxides and other contaminants from hot waste gas streams and production of ammonium sulfate from the removed sulfur oxides.

It is an additional object of this invention to produce with minimal energy consumption a valuable by-product for fertilizer or other uses while recovering as high as 95% or more of the sulfur dioxide emissions from a waste gas stream.

The foregoing and other objects of this invention are achieved by combining, with certain significant modifications, the scrubbing process of the aforesaid U.S. Pat. No. 3,957,951 with a subsequent oxidation process for converting the removed sulfur oxides to ammonium sulfate. Specifically, the process of the invention comprises cooling a waste gas stream to a temperature below 120° F., and preferably below 110° F., passing the waste gas stream in sequence through at least two separate absorption zones utilizing as an absorbent a recirculated aqueous salt solution of ammonium sulfite-bisulfite, the absorbent in the first (lower) absorption zone having an initial pH of from 6.5 to 9.0 and a salt concentration of 20 to 50%, the absorbent in the second (upper) absorption zone having an initial pH of from 5.2 to 7.0 and a salt concentration of 0.1 to 10%, withdrawing a portion of the aqueous ammonium sulfite-bisulfite salt solution from the lower absorption zone, oxidizing the withdrawn ammonium sulfite-bisulfite salt solution in the presence of air at a temperature below about 200° F. and a pressure between about 50 and 200 psig for a time sufficient to substantially convert the salts to sulfate salts and recycling the ammonia and sulfur dioxide vapors liberated during oxidation to the first absorption zone.

The single FIGURE of the drawing is a simplified diagrammatic illustration of one embodiment of the process of the invention.

The two-absorption-zone scrubbing process possesses the important ability in the combined system of permitting recycle of the ammonia and sulfur dioxide vapors vented from the oxidation step to the absorption zones without upsetting the chemical balance or efficiency of the scrubbing operation. The two-loop absorber has sufficient flexibility to pick up the recycled ammonia and sulfur dioxide in the first absorption zone, where an excess of ammonia can be used to assist absorption, and the excess ammonia can then be cleaned-up in the second loop.

With the important exceptions set forth below, the scrubbing portion of the present process is the same as that set forth in the aforesaid U.S. Pat. No. 3,957,951. Since there is no need to produce a product containing a high ratio of ammonium as compared to ammonium bisulfite as compared to ammonium sulfite, the first or lower absorption loop can be operated at more alkaline conditions, thus improving $SO_2$ absorption efficiency. The inlet pH of the lower loop may be as high as 9 and the exit pH as high a 7. At inlet (or initial) pH's less than about 6.5, $SO_2$ absorption would not be very efficient. At inlet pH's above 9, the $NH_3$ vapor pressure and thus $NH_3$ loss in the upper loop would be too great.

About 90-95% of $SO_2$ absorption occurs in the first (lower) absorption zone. The salt concentration in the first zone is from about 20 to 50%, preferably 30 to 40%—also higher than that of U.S. Pat. No. 3,957,951. In the latter patent, salt concentration in the first zone was held below certain critical limits to avoid sulfate formation. In the present process, sulfate formation during absorption is not detrimental; infact, it is desirable. Thus, higher salt concentrations are used in the lower loop to minimize subsequent energy requirements for evaporation of the ammonium sulfate solution. The inlet pH in the second (upper) absorption zone as well as the salt concentration should be kept low to minimize ammonia emissions and fume formation—the pH should be from 5.2 to 7.0, preferably from 5.8 to 6.4 and the salt concentration should be from 0.1 to 10%.

The absorbate from the lower absorption stage contains proportionately more bisulfite than sulfite. Part of this stream is cooled, adjusted for pH and recycled. The rest is withdrawn as product and collected in a surge tank, which provides some holdup capacity prior to oxidation, for improved control of the oxidation reaction. This surge tank serves the additional purpose of providing residence time for completion of the neutralization reaction between aqueous ammonia and ammonium bisulfite.

There are two ways of converting the ammonium bisulfite to ammonium sulfate. The preferred way is to first neutralize the bisulfite to sulfite using ammonia, and then oxidize the sulfite to the sulfate. The other way is to first oxidize the bisulfite to the bisulfate and then neutralize the bisulfate to the sulfate with ammonia. The disadvantage of the latter approach is that significant amounts of sulfur dioxide would be released during the exothermic oxidation reaction, thus requiring considerable recycle of $SO_2$ to the flue gas scrubber. Consequently the preferred route is to neutralize first, preferably with anhydrous $NH_3$ to eliminate dilution, and chemically tie down the $SO_2$ before oxidation. There will be a small amount of ammonia gas which might be released in this case, but the quantity is quite small compared to the volume of $SO_2$ that might be released in the other case.

According to the preferred mode of operation, ammonium sulfite solution from the surge tank is fed to the oxidation reactor. The oxidation reaction converting ammonium sulfite to ammonium sulfate is exothermic, releasing significant quantities of heat, although some heat-added as steam-may be used for start-up. Since the solubility of oxygen diminishes with increasing temperature, it is important to hold the temperature down by removing the heat of reaction by a suitable means. The temperature in the reactor should be held below 200° F., preferably at 180°-190° F. At temperatures below about 160° F., the rate of reaction is slower than the rate of oxygen solution. Pressure in the reactor should be controlled at between about 50 and 200 psig, preferably about 75-125 psig. Time the oxidation reactor will be from ½ to 4, usually about 1½, hours. The resulting solution of ammonium sulfate may be used as such or evaporated and crystallized to make a solid fertilizer product. The ammonia and sulfur dioxide produced by decomposition of product within the reactor is recycled to the absorption zone of the scrubber.

The following is a typical example of the practice of the invention. The example is set forth in connection with the diagrammatic illustration of the process shown in the drawing. Unless otherwise indicated, all parts are by weight.

EXAMPLE

Flue gas at 450° F., exhausted from a high sulfur coal-fired power boiler induced draft fan at a rate of 340,000 actual cfm, is quenched to its web bulb temperature of about 140° F. in a brick-lined duct 1 prior to entering the flue gas scrubber 2. In the lower section of the scrubbing tower, the flue gas is further cooled to about 100° F. by a 2-stage water spray in cooling zones 3 and 4 which simultaneously knocks down suspended particulate matter from an inlet loading of 2.5 gr/sdcf (grains per standard dry cubic foot) to about 0.2 gr/sdcf. A dilute suspension of fly ash in water exists in the base of the scrubber. This is cooled by circulation of the hot water by a pump 5 through heat exchanger 6 where the heat is transferred to a suitable cooling medium, such as water, and recirculated to the lower assembly of spray nozzles in cooling zone 3. A similar cooling and recirculation loop is maintained for the upper spray (cooling) zone 4.

As the gas passes upward through the tower and is cooled, substantial amounts of moisture condense out and mingle with the circulating water stream. This condensation action assures that essentially all (99% or better of plus-micron and 60–80% of sub-micron) particulate matter is removed from the flue gas. Condensate from the upper cooling stage overflows into the lower cooling stage. The net condensate leaves the system from the base of the quench section, and carries with it all the particulate matter removed from the flue gas. Since the temperature of the liquor from the base section is very close to the wet bulb temperature, it contains a minimum amount of dissolved sulfur dioxide.

In the two absorption stages (zones 7 and 8), the cool clean flue gas passes upward through a series of six perforated or valve trays, where it comes into contact with aqueous solutions of ammonium sulfite and ammonium bisulfite. These solutions absorb sulfur dioxide from the flue gas, and a reaction occurs in the liquid phase between the ammonium sulfite and sulfur dioxide to form additional ammonium bisulfite. In the first (lower) absorption stage, identified as zone 7 in FIG. 1, the total concentration of sulfite and bisulfite salts is about 40% by weight in the feed stream. The inlet temperature and pH are 95° F. and 6.8 respectively. In the second (upper) absorption stage, identified as zone 8, the total salt concentration of the feed is about 5.5% by weight, with temperature and pH being 95° F. and 6.1 respectively. Aqueous ammonia ($NH_4OH$) is added to both the first and the second absorption solution recycle streams to control the pH at values close to the design conditions indicated above.

Part of the absorbate from the lower absorption zone is cooled from 102° F. to 95° F., adjusted to a pH of 6.8 and recycled; the rest is withdrawn as product and collected in surge tank 9. The ammonium sulfite-bisulfite absorbate is now neutralized with ammonia converting the bisulfite to sulfite. Ammonium sulfite is fed from surge tank 9 to oxidation reactor 10.

The internal construction of this oxidation reactor consists of several perforated plates with downcomers, designed to provide for frequent redistribution of the gas and intimate contact between the phases. About 95 to 98% of the oxygen in the supply air is utilized in the oxidation reaction. Unreacted air, consisting mostly of nitrogen, leaves the oxidation reactor from the top and is cooled by heat exchange with a suitable medium, such as water. Some condensation of water vapor as well as ammonia and $SO_2$ vapors occurs in this heat exchanger. The condensate is refluxed to the top tray of the reactor, and the cooled uncondensed gases (oxidizer spent air containing the remaining traces of $NH_3$ and $SO_2$) are recycled to the absorption zone of the flue gas scrubber.

The exothermic oxidation reaction releases 67.7 kilocalories/gram mole (923.0 Btu per lb.) of ammonium sulfate produced. Heat is removed, as indicated on the drawing, by a sidestream of liquid withdrawn from the side of the reactor, cooled in an external heat exchanger against a suitable medium, such as water and returned to the reactor. One or more of these external cooling loops may be used, so as to maintain a temperature in the reactor in the range of 180°-190° F. The pressure in the reactor is controlled at 100 psig. Since the reactor is designed for countercurrent flow of liquid and gas, the partial pressure of the oxygen will be highest at the base, and essentially stoichometric conversion of the ammonium sulfate will be achieved. The ammonium sulfate solution is withdrawn from the base of the reactor and collected in a tank for further processing. With evaporation and crystallization, a solid ammonium sulfate product can be produced.

The advantage of this combination of the scrubbing system with an oxidation and crystallization operation is that a valuable by-product is produced with minimal energy consumption and 95% or better recovery of $SO_2$. In addition, low level heat is recovered and used in other parts of the processing operation, e.g. an evaporator-crystallizer can be operated under vacuum and heat from the hot water recovery system can be utilized for operation of the evaporator.

We claim:

1. A process for the removal of sulfur dioxide and other contaminants and the recovery of ammonium sulfate as a by-product from a hot waste gas stream comprising cooling said waste gas stream to a temperature below about 120° F., passing said waste gas stream in sequence through at least two separate absorption zones utilizing as an absorbent a recirculated aqueous salt solution of ammonium sulfite-bisulfite, the absorbent in the first absorption zone having an initial pH of from 7 to 9.0 and a salt concentration of 30 to 50%, the absorbent in the second absorption zone having an initial pH of from 5.2 to 7.0 and a salt concentration of 0.1 to 5%, withdrawing a portion of said aqueous ammonium sulfite-bisulfite salt solution from said first absorption zone, oxidizing said withdrawn ammonium sulfite-bisulfite salt solution in the presence of air at a temperature below about 200° F. and a pressure between about 50 and 200 psig for a time sufficient to substantially convert said salts to sulfate salts and recycling the remaining ammonia and sulfur dioxide vapors to the first absorption zone.

2. The process of claim 1 in which the ammonium bisulfite in the withdrawn portion of the salt solution is neutralized prior to oxidizing.

3. The process of claim 2 in which the bisulfite is neutralized with ammonia.

4. The process of claim 3 in which the ammonia is anhydrous.

5. The process of claim 1 in which the absorbent in the first absorption zone has a pH of from 7 to 8 and the absorbent in the second absorption zone a pH of from 5.8 to 6.4.

6. The process of claim 1 in which the absorbent in the first absorption zone has a salt concentration of from 30 to 40%.

7. The process of claim 1 in which the oxidation step is at a temperature between 180° and 190° F.

8. The process of claim 1 in which the pressure of the oxidation step is between 75 and 125 psig.

9. The process of claim 1 in which the waste gas stream, prior to passing through said absorption zones, is cooled to a temperature below 110° F.

* * * * *